April 29, 1952 R. J. KIRCHER 2,594,449
TRANSISTOR SWITCHING DEVICE
Filed Dec. 30, 1950 3 Sheets-Sheet 1

INVENTOR
R. J. KIRCHER
BY N. S. Ewing
ATTORNEY

April 29, 1952 R. J. KIRCHER 2,594,449

TRANSISTOR SWITCHING DEVICE

Filed Dec. 30, 1950 3 Sheets-Sheet 2

INVENTOR
R. J. KIRCHER

BY N. S. Ewing
ATTORNEY

INVENTOR
R. J. KIRCHER
BY N. S. Ewing
ATTORNEY

Patented Apr. 29, 1952

2,594,449

UNITED STATES PATENT OFFICE 2,594,449

TRANSISTOR SWITCHING DEVICE

Reymond J. Kircher, Summit, N. J., assignor to Bell Telephone Laboratories, Incorporated, New York, N. Y., a corporation of New York Application December 30, 1950, Serial No. 203,624

13 Claims. (Cl. 171—97)

This invention relates in general to gating circuits and more particularly to gating circuits utilizing as one of the stages thereof a transistor connected as a two-terminal variable impedance element.

In many types of communications systems, such as pulsing or time division multiplex systems, gating circuits are widely used. In certain prior art applications in which power consumption and power dissipation have been major considerations, or in which space limitation has been an important factor, it has been customary to use gating circuits employing vacuum tube diodes or crystal rectifiers. Although such units operate to give high signal suppression when the gate is "closed," a slight loss in signal transmission is incurred when the gate is "open."

It is a broad object of the present invention to provide an improved form of gating circuit; and more specifically to provide a compact, low power consuming unit which is characterized by appreciable operating gain in a forward direction when the gate is "open," as well as high suppression when the gate is "closed."

These objects and others are realized in accordance with the present invention in a gating circuit comprising one or more transistor stages in which the terminating stage is connected as a two-terminal variable impedance. This impedance, which may be placed across the output of a preceding transistor stage, is caused to vary between a relatively low value when the gate is "closed" and a relatively high value when the gate is "open." In other embodiments, the two-terminal variable impedance property of the transistor effected as described herein may be utilized in gating circuits comprising a single transistor or a pair of transistors in push-pull arranged to operate in alternation.

A preferred embodiment of the first example comprises a gating circuit having two transistor stages connected in tandem, the second stage functioning as an impedance across the collector to ground terminals of the first stage, in parallel with the signal output circuit. The signal input circuit is connected to the emitter circuit of the first stage. An energizing source alternates between positive and negative potentials, so that during one part of the cycle the emitter of the first stage is in positive operating relation with respect to the other electrodes, while the emitter of the second stage is negative; and during a second part of a cycle, the opposite condition obtains. When the gate is "open" for the passage of signal current, that is, when the emitter of the first stage is positive, the second stage presents a high impedance across the output terminals of the first stage. When the emitter of the first stage is negative, causing the transmission of this stage to be greatly reduced and hence the gate to be partially closed, the condition of the second stage develops a high positive feedback through the base resistance so that it presents a zero or near zero impedance across the output terminals of the first stage, thus providing a shunt on the first stage for the already reduced output signals.

Another embodiment having a somewhat more restricted range of operation consists of a single transistor stage which performs the function of the two-stage circuits described above. The signal input terminals are connected to the load circuit, across which is connected a transistor circuit which functions as an impedance which varies from a very high value when the gate is open to substantially zero when the gate is closed. This is accomplished by providing a pulsing circuit which is connected between the collector and the energizing source, and by providing a relatively high feedback resistance in a circuit of the base electrode of the transistor.

The same feature, whereby the transistor presents a zero impedance when the emitter is positive and a very high impedance when the emitter is negative, is utilized in another embodiment in which a pair of transistors is connected in a substantially push-pull arrangement between a low frequency source and an output circuit, a high frequency gating pulse being periodically applied to energize the electrodes. This arrangement permits a periodic sampling of both positive and negative components of the applied signals.

Other objects and features of the present invention will be better understood from a detailed study of the specification hereinafter with reference to the attached drawings in which.

A transistor suitable for present purposes is disclosed and claimed in Patent No. 2,524,035, issued to John Bardeen and W. H. Brattain October 3, 1950. Such a unit comprises a small block of semi-conductive material, such as N-type germanium, with which are associated three electrodes. One of these, known as the base electrode, makes a low resistance contact with one face of the germanium block, and may take the form of a plated metal film; whereas the others, one termed the "emitter" and the other, the "collector," may, for example, make point-type contacts with another face of the block. Other designs in which the three electrodes function to produce transistor properties are applicable also.

As pointed out in the foregoing paragraphs, the function of a "gated" amplifier may be realized by using one or two transistors in simple circuit configurations, which permit, or control, the passage of a signal through the device for a predetermined interval, after which the gate is closed, a high degree of signal suppression occurring until the gate is opened again.

I have discovered that when the terminating transistor in such a gating circuit is connected as a two-terminal impedance network across the signal output circuit, it exhibits certain advantages over prior art circuits of the kind, in that whereas high suppression is produced when the gate is closed, appreciable gain is also provided when the gate is open.

Figure 1A:
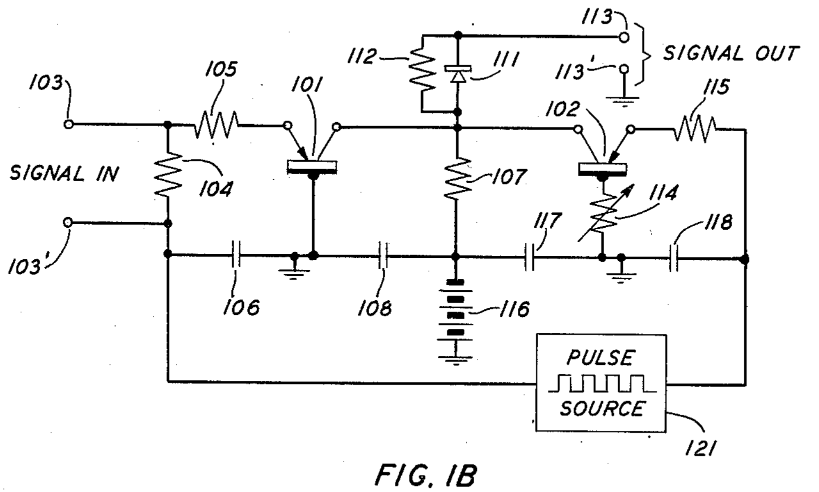
Fig. 1A shows an embodiment comprising two transistor stages in cascade wherein the collector to base circuit of the second stage functions as a two-terminal impedance element across the output terminals of the first stage.

Fig. 1A of the drawings shows a "gating" circuit employing two transistor stages in tandem connection, in which the first stage including transistor 101 is operated as a three-electrode amplifier having an "on-off" switching function, and the second stage including transistor 102 is connected across the output terminals of the first stage as a two-terminal impedance, presenting a low or zero impedance in gate "closed" condition, and a relatively high impedance in gate "open" condition.

The signal input terminals 103, 103′ are connected across the resistance 104 of the order of 500 ohms, one terminal of which is connected to the emitter of transistor 101, and the other terminal of which is connected through the signal by-pass condenser 106 to ground, to which point is also connected the base electrode of transistor 101. A coupling or load resistance 107, which is connected betwen the common junction of collectors of the transistors 101 and 102 and the negative terminal of the potential source 116, is of the order of 20,000 ohms, and functions to provide a collector biasing voltage for the respective collectors. An inductance of suitable value for the signal frequency could be substituted alternatively. Signal by-pass circuits are completed between the negative terminal of potential source 116 and ground through condenser 108 in the first stage, and through condenser 117 in the second stage.

In transistor 102, which is connected as a two-terminal resistance network across the output of the first stage in parallel with resistor 107, the emitter electrode is connected to ground through a circuit which includes the resistor 115, of the order of 500 ohms, and the signal by-pass condenser 118. In the base circuit associated with transistor 102, there is introduced an external resistance 114 which is chosen in accordance with the principles set forth in application Serial No. 58,685, filed November 6, 1948, now Patent 2,585,078, by H. L. Barney, to produce a condition in which $\alpha$, the ratio of short-circuit collector current increment to emitter current increment is greater than unity, under proper conditions of electrode bias. This circuit 114 may have a value of several thousand ohms, between the base connection and ground to facilitate the operation of transistor 102 in providing a high degree of attenuation in the signal path when the gate is to be closed. This high attenuation is produced because of the low shunt impedance developed under the above conditions at the shunting terminals of transistor 102.

The gating control for the signal path is accomplished by simultaneously providing biasing potentials of opposite sign to the emitters of transistors 101 and 102 from the pulse source 121, which pulsed bias is superposed on the direct-current bias from the source 116. Pulse source 121 may assume the form of a multi-vibrator, if electronic control is desired, or alternatively, if mechanical control is desired, an alternating switch, commutator, or relay, any one of which functions to produce pulses of opposite polarity in alternation. One terminal of pulse source 121 is connected through resistors 104 and 105 to the emitter of transistor 101, and the opposite terminal of pulse source 121 is connected through resistor 115 to emitter of transistor 102.

Signal output connections are provided across terminals 113, 113′, the latter of which is grounded and the high potential terminal 113 of which may be attached to either collector. For optimum operation, this connecting circuit may include the diode 211 in parallel with the resistance element 112, the function of which will be discussed hereinafter.

Figure 1B:
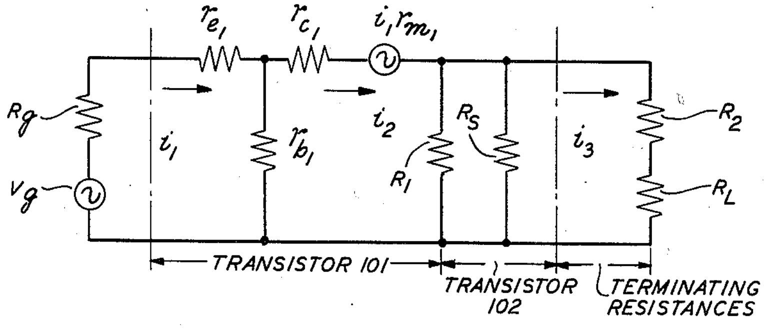
Figs. 1B, 1C and 2B represent equivalent circuit diagrams of the schematic circuits shown in Figs. 1A and 2A.

For an understanding of the sequence of operations of the circuit from gate "open" to gate "closed" condition, the reader is referred again to Fig. 1A, and also to Fig. 1B which shows an equivalent diagram of the two-stage circuit of the former. In Fig. 1B, the input signal voltage impressed across the terminals 103, 103′ is represented by the generator $V_g$, $R_g$ representing the internal resistance presented by the signal source in parallel with resistance 104. The transistor 101 is represented by an equivalent T network consisting of emitter resistance $r_{e_1}$, collector resistance $r_{c_1}$, and base resistance $r_{b_1}$. The amplifying property of the transistor is represented by the current generator $i_1 r_{m_1}$ connected in the collector lead, where $i_1$ is the signal current impressed on the emitter, and $r_{m_1}$ is the transimpedance of the transistor 101. The biasing resistor 107 connected between the collector and base electrodes is represented as $R_1$, and the two-terminal impedance presented by the transistor 102 across the terminals of transistor 101 is represented by $R_s$. The output branch of the circuit through the diode 111 in parallel with resistor 112 to the terminals 113, 113′, across which there is presumed to be connected a load, is represented by the resistance $R_2$ in series with $R_L$, the useful load resistance.

The gate is "open" when normal positive bias is applied to the emitter of transistor 101, and moderate negative bias is simultaneously applied to the emitter of transistor 102. In this condition, transistor 101 is operative, and transistor 102 is passive. For this connection, when the emitter current is zero or negative, the impedance $R_s$ presented by transistor 102 to transistor 101 is of the order of 20,000 ohms. If the value $R_1$ of resistance 107 is of the order of 20,000 ohms, the resulting load across the collector terminals of transistor 101 is of the order of 10,000 ohms, providing an operating gain of the order of 18 decibels, a large part of which may be realized in the useful load $R_L$, assuming an optimum impedance match obtains. The effective gain will be further increased if the resistance 117 is replaced by a reactance tuned to the signal frequency.

It is apparent from the above that the circuit of the present invention provides sizable gains when the gate is "open."

If, now, the biasing potentials for transistors 101 and 102 are simultaneously reversed in sign, the following gate "closed" condition obtains:

Transistor 101 becomes passive, its input impedance rising to a high value of tens of thousands of ohms in $r_{e_1}$, the emitter resistance, while $r_{b_1}$, the base resistance remains a few hundred ohms. Substantially no transistor action can take place, inasmuch as $r_{m_1}$, the transimpedance, becomes negligible. An appreciable loss has thus been introduced in the signal path in passing through transistor 101. Now, consider the effect produced by transistor 102 in greatly increasing the loss in the signal path.

When the bias on transistor 102 is made normally positive, the unit becomes an active element. Due to the regenerative property inherent in the device, which can be augmented and controlled by the external base resistance 114, it has been demonstrated that a very low or substantially zero impedance may be developed across the collector to ground terminals. Thus, the equivalent of a short circuit is placed on the signal path in addition to the attenuation already introduced by transistor 101.

It is feasible to use the varistor 111 in the output lead 113 to provide a low impedance toward the common point when the gate is "open," but a high impedance looking back from this point when the gate is "closed." It also appears that by introducing a suitable amount of resistance in the connection between terminal 113 and the transistor collectors, direct-current reinsertion is feasible, thereby replacing the direct-current component which is lost by signals as they pass through transistor 101. Such an arrangement is sometimes described as a direct-current "clamp." Neglecting the effect of stray couplings, excellent signal suppression may be attained in this way. For example, 70 decibel suppression appears to be a reasonable expectation, as will be shown hereinafter.

Figure 1C:
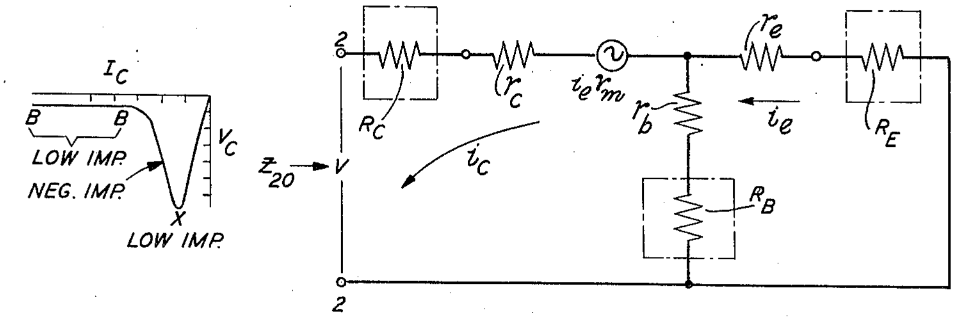
Figure 2A:
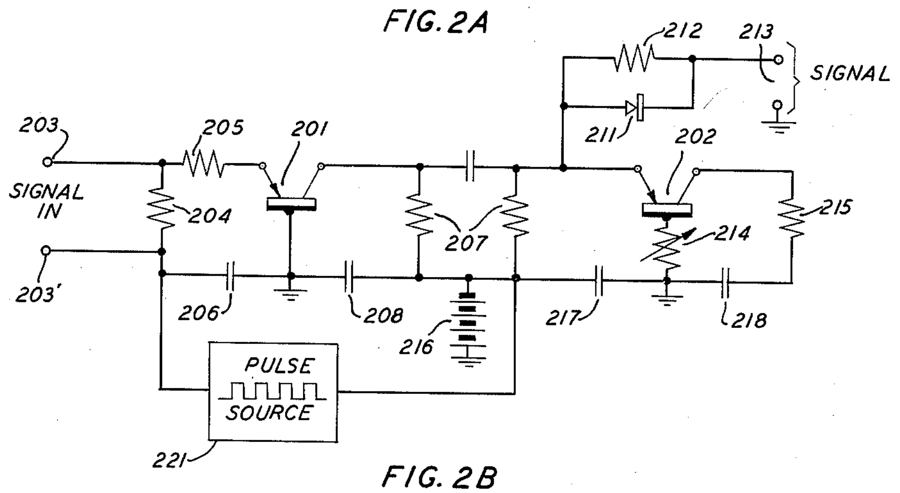
Fig. 2A is a modification of the two-stage circuit of Fig. 1A in which the emitter to base circuit of the second stage functions as the two-terminal impedance element.
Figure 2B:
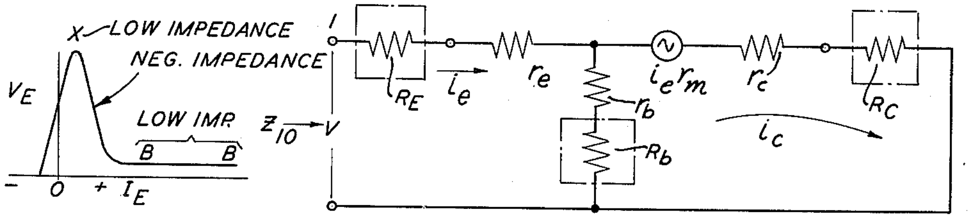

Another arrangement by which a similar gating operation may be obtained is shown in Fig. 2A. For convenience in comparing with the preceding circuit, like elements have corresponding designations. In this circuit the collector output of transistor 201 is connected to the emitter terminal of transistor 202. As in the circuit of Fig. 1A, this arrangement can also be made to provide substantially a short-circuit on the signal path when the bias on the emitter of transistor 202 is positive, and conversely, a very high shunting impedance, when the bias is reversed. The two circuits of Figs. 1A and 2A can be best compared by reference to Figs. 1C and 2B, which show equivalent diagrams of the second stage in each of these circuits.

Tests have shown that even for moderately negative emitter bias voltage, the emitter resistance, $r_{e_2}$ is of the order of tens of thousands of ohms. The value for the emitter resistance $r_{e_2}$ may rise to a hundred thousands ohms or more in some cases. This condition usually occurs in the case of transistors which have not been formed with the emitter point as the collector earlier in its history. With a change in emitter bias from negative to even slightly positive, $r_{e_2}$ very abruptly falls to a value of only a few hundred ohms. However, in the case of the element $r_{c_1}$, this property of the transistor does not show nearly so marked a change in value with change in bias voltage, and may in fact be maintained at a nearly constant value over quite a range of values of emitter bias, both negative and positive by selecting an appropriate value for the collector current. It can be shown analytically that it is possible to obtain a low, a zero, or even a negative impedance when the collector side of the transistor is used as described, or, in the case of the emitter side connection, to obtain a still lower impedance which may be made zero or even negative.

As described above, Fig. 1A shows the circuit applicable for the condition where the collector side is to be used to obtain a low or a zero impedance, and Fig. 2A indicates the condition when the emitter side is to be used to obtain a low or a zero impedance. The transistor parts of the equivalent circuits are designated by elements $r_{e_2}$, the emitter resistance, $r_{b_2}$, the base resistance, $r_{c_2}$, and $r_{m_2}$, the collector resistances, and the resistive component of the forward transimpedance. In dotted boxes are shown possible external resistances $R_e$, $R_b$, $R_c$ in series respectively with the corresponding elements of the transistor, as indicated by the subscripts. In general, an auxiliary resistance $R_{b_2}$ is nearly always to be added in the circuit of transistor 102, since it has an essential function in producing a condition of low, zero, or negative impedance, whichever of the two circuits described in Figs. 1A or 2A is used. When advantageous, either one or both of $R_{e_2}$ and $R_{c_2}$ may be added to the circuit of transistor 102.

The appropriate impedance equations as derived from small signal theory for the two circuits described hereinbefore, are respectively as indicated below. (1) For the impedance which the emitter side of transistor 102 presents.

$$Z_{10}=\frac{Z_{11}Z_{22}-Z_{12}Z_{21}}{Z_{22}} \tag{1}$$

and, (2) for the impedance which the collector side presents, $$Z_{20}=\frac{Z_{11}Z_{22}-Z_{12}Z_{21}}{Z_{11}} \tag{2}$$

where $$Z_{11}=(r_{b_2}+R_{b_2})+(r_{e_2}+R_{e_2})$$
$$Z_{12}=(r_{b_2}+R_{b_2})$$
$$Z_{21}=(r_{b_2}+R_{b_2})+r_{m_2}$$

and $$Z_{22}=(r_{b_2}+R_{b_2})+Ar_{c_2}+R_{c_2})$$

From these equations, for that frequency range in which the above impedances are essentially resistive (of the order of several megacycles), it is appreciated that the numerator of either expression may be made zero by suitable adjustments of the bias voltages, and by the use of additional external resistances, $R_{b_2}$, $R_{e_2}$ and $R_{c_2}$ either in whole or in part. Furthermore, the inherent variation between units may be minimized by adding resistance in emitter or collector circuits, as well as in the base to ground circuit. It has been shown by previous experiments in the art, that a condition may be realized for which either $Z_{20}$ or $Z_{10}$ have a low value over quite a variation of collector or emitter current.

While it is possible to make adjustments while viewing the pattern of input impedance on an oscilloscope to obtain a low or substantially a zero impedance, it is expected that variations for different transistors in the same circuit may result in a substantial variation about the zero condition. This is particularly true if the zero point indicated at, X, in the diagrams referred to above is selected. However, if the region indicated by B—B, is used, no critical condition occurs. The uniform nature of the negative resistance region of these characteristics is also a feature of interest.

In order to estimate the degree of signal suppression attainable, a circuit for operation of the gated transistor amplifier is shown using two transistors as shown in the Figs. 1A and 2A, in which the following transistor equivalent circuit elements for the transistor 101 in the passive condition have been assumed. Referring to Fig. 1B:

$r_{e_1}=250{,}000$ ohms
$r_{b_1}=300$
$r_{c_1}=15{,}000$
$r_{m_1}=3000$

Also assumed that transistor 102 places a shunt across the signal circuit, $R_s=100$ ohms; and that the varistor series resistance for this condition is $R_2=50{,}000$ ohms. For convenience, let $$R_g=R_L=1000 \text{ ohms}$$

The expression for operating gain is obtained as follows:

$$O.G.=\frac{4R_gR_L}{r_{b_1}^2}\left[\frac{R_s}{R_s+R_2+R_L}\right]^2\left[\frac{r_{b_1}(r_{b_1}+r_{m_1})}{(R_g+r_{e_1}+r_{b_1})(r_{c_1}+R_s)-r_{b_1}(r_{b_1}+r_{m_1})}\right]^2$$

which gives for the values assumed above, O.G.=−74 decibels.

Figure 3A:
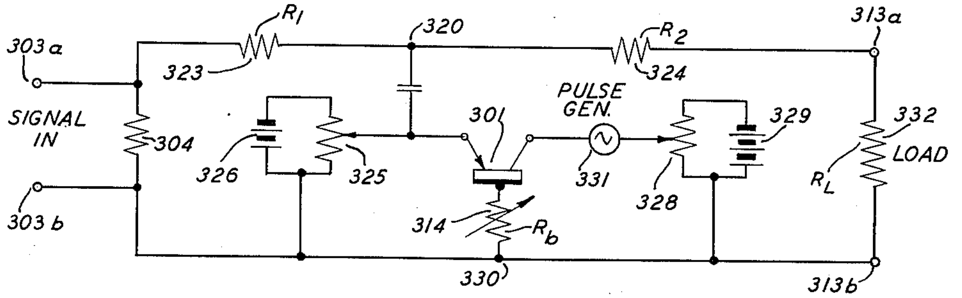
Fig. 3A is a modified form of a gating circuit in accordance with the present invention in which only a single transistor is utilized.

The functional properties of transistors as described above are utilized in a modified form of the invention employing a single transistor which is indicated in Fig. 3A of the drawings. Referring in detail to this circuit, the input signal is applied across terminals 303*a*, 303*b*, and the output signal is taken off across terminals 313*a*, 313*b*. In series, between terminals 303*a* and 313*a* are two resistances 323 and 324, the magnitudes of which depend on the magnitudes of the generator and load resistances 304 and 332, and upon the condition of attenuation desired, as set forth in an example found later herein. Terminals 303*b* and 313*b* are connected to a common or ground point. Between the junction 320 of resistors 323 and 324, and the emitter terminal of the transistor 301, which is similar in form to the transistors described hereinbefore, is connected a coupling condenser 327 of suitable size for signal frequencies. The emitter is biased to the desired positive potential through the potential divider 325 which is connected across the direct-current source 326. For the two-terminal impedance connection, the collector terminal of transistor 301 might be used instead of the emitter, or alternatively, one of the other forms of transistor connections which in substance perform in the same manner. A pulse generator 331, or equivalent control signal generator, is included in the collector or control electrode bias circuit, which comprises the potential divider 328 connected across the potential source 329 to provide a negative potential bias of the order of 40 volts.

A suitable value for an external base to ground resistance 314 chosen for the particular arrangement of Fig. 3A is of the order of several thousand ohms.

As pointed out hereinbefore with reference to the operation of transistor 102 in the double transistor gating circuit, conditions of bias and the values of the resistance elements in the transistor circuit may be made such that with no control signal applied, the transistor offers a low impedance between the terminals 313*a* and 313*b* which may approach a zero impedance. This effect, in conjunction with the series resistances of elements 323 and 324, which are assumed to be of reasonably high value, results in a high degree of attenuation; hence the gate is "closed."

For a suitable value of control signal, however, the transistor may be made to present a high impedance between points 320 and 330, so that the input signal may be transmitted with moderate loss to the output terminals 313*a*, 313*b*. The loss will depend on the value of the load impedance, on the values of resistors 323 and 324, and on the value of the shunting impedance presented by the transistor 301.

As an interesting further exploitation of the possibilities of this circuit, it can be shown that for those conditions of operation of the transistor which result in a suitable negative resistance being produced between points 320 and 330 it should be possible to achieve a small amount of transmission gain from input to output terminals. These considerations will now be explored with reference to the equivalent diagram shown in Fig. 3B of the drawings.

Figure 3B:
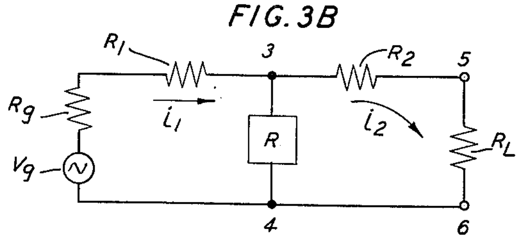
Fig. 3B is the equivalent circuit diagram of the same.

Referring in detail to Fig. 3B the following relationships obtain:

$$i_2=V_g\left[\frac{R}{(R+R_2+R_L)(R_1+R+R_g)-R^2}\right]$$

Power output $=R_Li_2^2$

Operating power gain $$=4R_gR_L\left[\frac{R}{(R+R_2+R_L)(R_1+R+R_g)-R^2}\right]^2$$

where $R$=the two-terminal resistance presented by transistor 301,
$R_1$=resistance of resistor 323,
$R_2$=resistance of resistor 324,
$R_g$=the resistance of signal source, and
$R_L$=the load resistance.

To minimize the output power, $i_2$ should be minimized. This occurs when R is made low, approaching zero, thereby producing a high degree of attenuation.

It is noted that as the denominator of the power gain expression approaches zero, the gain moves toward infinity, which is of course an unstable condition. This condition occurs when $$R=-\frac{(R_1+R_g)(R_2+R_L)}{R_1+R_2+R_g+R_L}$$

which is also the condition for $i_2$ to become infinite. Since $R_1$, $R_2$, $R_g$, $R_L$ are positive quantities, it is appreciated that the above condition requires that R be negative.

It is preferable in using negative resistances that the nature of the negative resistance be known in order to realize a stable operating condition. In case the emitter to base circuit is used for obtaining a negative resistance the resulting negative resistance is "open circuit" stable. Accordingly, a suitable value for operation must be chosen so as to obtain stable operation with a reasonable margin for safety. In case the collector to base circuit is used for obtaining a negative resistance, the resulting negative resistance is also "open circuit" stable, but of different magnitude. Hence a suitable value of negative resistance must be selected in this case also to obtain stable operation with a margin of safety. Looking into base to ground circuit, the opposite type of negative resistance is found with suitable adjustment of resistance in the other arms of the transistor. Consider the following samples.

Let $R_1=R_2=R_g=R_L$; then the condition for infinite gain occurs for $R=-3R_1$. For $R=-2.5R_1$, the operating power gain is, $O.\ G.=+5.2$ decibels. For $[R]<3R_1$ the region of negative resistance is suitable for operation of the emitter to base negative resistance circuit where the bracket denotes the absolute value. A greater margin of stability with lower gain is obtained by using $[R]<2.5R_1$. For $R=-4R_1$, the operating power gain is $O.\ G.=+1.15$ decibels. This region of negative resistance values $[R]<3R_1$ requires the stable "open circuit" negative resistance condition, which occurs with the collector to base circuit. Negative resistance stability requirements have been considered extensively in the literature, and will not be considered here, other than to point out that such requirements must be in effect to obtain stable operation. As an indication of the amount of signal suppression obtainable, let $R_1=R_2=R_g=R_L=1000$ ohms and let $R=100$ ohms giving for the operating gain, $O.\ G.=-27$ decibels. And if, on the other hand, R is now changed to 20,000 ohms, keeping the other R's unchanged the operating gain becomes −6.5 decibels. For this condition, the least loss possible as R approaches infinity is −6.0 decibels.

Figure 4A:
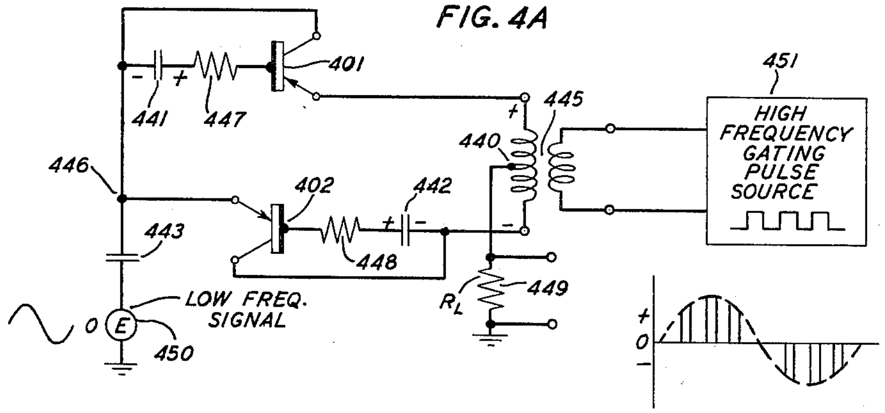
Fig. 4A is a balanced gating circuit using two transistors in push-pull relation.

Another modification of the present invention, which takes the form of a self-balancing gating or sampling circuit, is shown in Fig. 4A of the drawings. The principal function of this circuit is to obtain a high degree of symmetry, so that in the gate "closed" condition a very high signal suppression occurs, while in the gate "open" condition, a very low transmission impedance is realized. The self-balancing feature is obtained by using condensers 441, 442 and 443, having values depending on the frequency of operation, which require the currents to be the same in all of the transistor arms. In the circuit shown in Fig. 4A, the transistors 401 and 402, which are similar in form to those described hereinbefore, are connected in push-pull relation, with the emitter circuit of transistor 402 and the base circuit of transistor 401 respectively connected together to junction 446, which is connected through condenser 443 to receive the low frequency alternating current signal from source 450. The base circuit of transistor 402 and emitter circuit of transistor 401 are connected to opposite terminals of the secondary coil of transformer 445, which is coupled through its primary coil to the high frequency gating pulse circuit 451. Each of the base circuits of transistors 401 and 402 respectively include a condenser 441, 442 in series relation with one of the resistors 447, 448. The center tap of transformer 445 is connected through load resistor 449 to ground. A high-frequency square-topped gating pulse is applied through the primary coil of transformer 445.

Figure 4B:
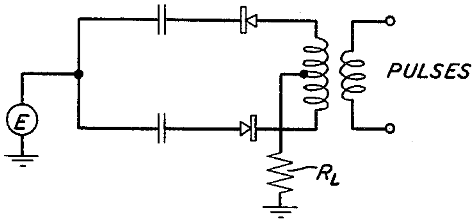
Fig. 4B represents a prior art circuit of similar type using crystal diodes which is shown for comparison.
Figure 4C:
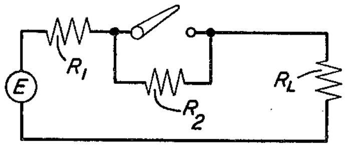
Fig. 4C is an equivalent diagram of a gating circuit representing one of the branches of the circuit of Fig. 4A.

A similar circuit using crystal diodes shown in Fig. 4B of the drawings is well-known. The use of the transistor instead of the diode takes advantage of the regenerative property of the transistor by which it is possible to secure an impedance approaching zero across the terminals of the transistor through which the signal passes in the gate "open" condition, whereas, in the gate "closed" condition this impedance rises to a relatively high value. The ratio of the resistances for the two conditions can be made very high, a feature which approximates the function indicated in Fig. 4C of these drawings. This represents a switch with an inherent series resistance $R_1$, having a shunt resistance $R_2$ across its contacts. With the switch closed good transmission occurs, while with the switch open, the transmission is attenuated, the effectiveness of the switch depending on how high a ratio can be obtained for $R_2$ to $R_1$.

The self-balanced transistor gate circuit, as in the case of other self-balancing circuits, permits sampling of a signal to be made in both positive and negative regions relative to a zero axis. The positive pulse applied from the pulsing source 451 produces a sufficiently positive potential on the emitters of both transistors 401 and 402 to make them conducting. Hence, when a positive potential signal is applied from the source 450, transistor 402 is rendered conducting; likewise, a negative signal renders transistor 401 conducting. Assuming that the low frequency signal from the source 450 is in the audio range, and the sampling pulse from source 451 is of the order of 100,000 cycles, a pulsed output of the applied audio signal, such as indicated, is produced in the load resistance 449. This appears to be most suitable in working between relatively low impedance terminals.

Figure 4D:
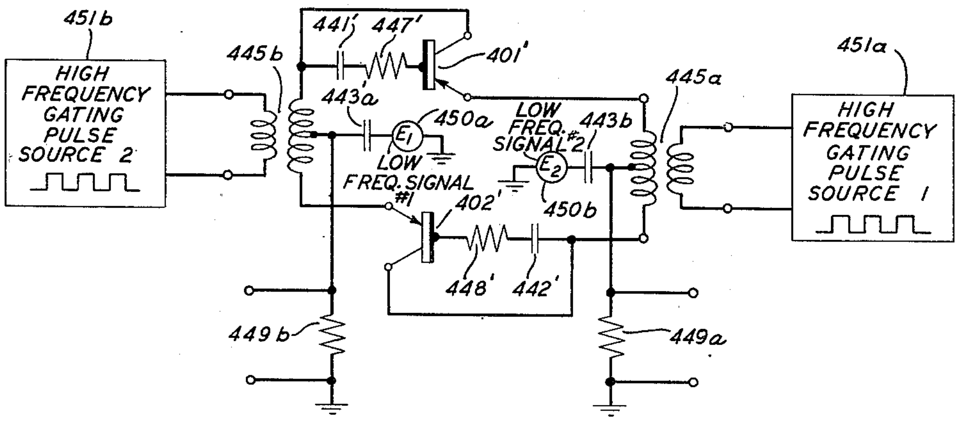
Fig. 4D is an equivalent diagram of a bilateral adaptation of the circuit of Fig. 4A.

Bilateral self-balancing action may be obtainable in a similar circuit, as represented in Fig. 4D, by the addition of a second high frequency gating pulse source 450b, and a second low frequency source 451b. The high frequency source 451b is coupled through transformer 445b to the base circuit of transistor 401 and the emitter circuit of transistor 402 in a manner symmetrical to the coupling of high frequency source 451. Connection is made to the second signal source 450a through the by-pass condenser 443b to a center tap on the opposite transformer 445a. The load resistance 449b which is connected between the center tap of transformer 445b and ground, provides an output circuit for the second sampled signal.

Accordingly, low frequency signals from the source 450a, are sampled by the high frequency gating pulse source 451a and appear across the output load resistance 449a; whereas low frequency signals from the source 450b are sampled by the high frequency gating pulse source 451b and appear across the output load resistance 449b.

It is appreciated that the emitter and collector terminals in the self-balancing circuit may be interchanged in order to utilize the similar property of low transmission loss when active, and high signal suppression when inactive, for collector to base terminals in the manner outlined in detail for transistor 102 in the tandem transistor gating circuit of Fig. 1. The control pulse polarity used in this case is opposite to that used in the first balanced circuit described.

It is apparent from the preceding description that the subject invention may be practiced through the use of a variety of circuit arrangements, a few preferred ones of which have been described herein. However, it should be understood that the scope of the invention is not limited to any of the particular elements or circuit configurations such as described herein by way of illustration.

What is claimed is:

1. In combination with a system comprising a signal source and a signal output circuit, a gating circuit connected to control the flow of signal current between said source and said output circuit, said gating circuit comprising a transistor including a semiconducting body, an emitter electrode, a collector electrode, and a base electrode all in contact with said body, said transistor connected as a two-terminal impedance element shunting said signal source and said signal output circuit, a source of variable potential connected to provide bias on at least one of said electrodes which intermittently alternates in polarity, said transistor connected to provide a signal path having an impedance which is low relative to the impedance of said signal output circuit at one polarity of said bias, and an impedance which is high relative to the impedance of said signal output circuit at the other polarity of said bias.

2. Switching means connected between a signal source and a signal utilization circuit, said switching means comprising a transistor having an emitter electrode, a collector electrode, and a base electrode all in contact with a block of semiconducting material, said transistor connected as a two-terminal impedance element betwen said source and said utilization circuit, and said transistor characterized by a ratio of short-circuit collector current increments to emitter current increments which under proper conditions of electrodes bias is greater than unity, and means comprising a source of biasing current for at least one of the electrodes of said transistor which varies between preselected values which are respectively positive and negative relative to a critical reference value whereby the two-terminal impedance presented by said transistor between said source and said utilization circuit in a given direction of current flow varies between substantially zero and a value which is high relative to the impedance of said signal utilization circuit.

3. A gating circuit comprising in combination a first and a second transistor, each including a semiconductor body, an emitter electrode, a collector electrode and a base electrode, all in contact with said body, signal input terminals connected to one pair of electrodes of said first transistor, signal output terminals connected to another pair of electrodes of said first transistor, said second transistor connected as a two-terminal impedance element across said output terminals, means connected to said transistors for biasing each of said transistors to normal operating condition, and means for substantially varying said biasing current above and below a certain critical value in at least one of said transistors whereby said second transistor presents an impedance which varies between an impedance which is low relative to the impedance across said output terminals and an impedance which is high relative to the impedance across said output terminals.

4. A gating circuit comprising in combination a pair of transistors each comprising an emitter electrode, a collector electrode, and a base electrode all in contact with a semiconducting body, the second transistor of said pair characterized by a ratio of short-circuit collector current increment to emitter current increment which, under proper conditions of electrode bias is greater than unity whereby said transistor presents a two-terminal impedance characteristic across the collector electrode of the first transistor of said pair, a source of direct current biasing potential connected to bias the electrodes of said transistors for normal operation thereof, a source of alternating potential connected to both of said transistors to periodically reverse the bias on the electrodes thereof, a signal input circuit connected across the emitter circuit of said first transistor, and a signal output circuit connected across the collector circuit of said first transistor circuit in parallel with the impedance presented by said second transistor, said signal output circuit including a unidirectional current conducting device which is poled for current conduction in a forward direction through said transistor.

5. A gating circuit in accordance with claim 4 in which a resistance element is connected in parallel with said unidirectional current conducting device, said resistance having a value which is high relative to the resistance of said unidirectional device in a forward direction and low relative to the resistance of said unidirectional device in a reverse direction.

6. A gating circuit comprising in combination a first and a second transistor, each comprising a semiconductor body, an emitter electrode, a collector electrode and a base electrode all in contact with said body, a signal input circuit connected between the emitter and base terminals in a first one of said transistors, a signal output circuit connected between the collector and base terminals of said first transistor, one of the pair of electrodes including said emitter and base electrodes of said second transistor connected to the collector electrode of said first transistor, the other electrode of said pair connected to the base electrode of said first transistor, the base electrode of said second transistor connected to the base electrode of said first transistor through a resistance which is high relative to the resistance of the base electrode of said second transistor, means for biasing said transistor electrodes to normal operating potentials, means connected to said first transistor and said second transistor for changing the biasing on the electrodes thereof in alternation from operating to non-operating condition, whereby when said first transistor is rendered operating said second transistor presents a high impedance across the collector and base terminals of said first transistor, and when said first transistor is rendered inoperative said second transistor presents substantially zero impedance across the collector and base terminals of said second transistor.

7. A gating circuit comprising in combination a first and a second transistor, each comprising a semiconductor body, an emitter electrode, a collector electrode and a base electrode in contact with said body, a signal input circuit connected between the emitter and base terminals in a first one of said transistors, a signal output circuit connected between the collector and base terminals of said first transistor, the collector electrode of said second transistor connected to the collector electrode of said first transistor, the emitter electrode of said second transistor connected to the base electrode of said first transistor through a resistance which is substantially zero, the base electrode of said second transistor connected to the base electrode of said first transistor through a resistance which is high relative to the resistance of the base electrode of said second transistor, whereby said second transistor presents a two-terminal impedance across the collector of said first transistor, means for biasing said transistor electrodes to normal operating potentials, means connected to said first transistor and said second transistor in alternation for changing the biasing potentials on the electrodes thereof from operating to non-operating condition, whereby when said first transistor is rendered operating said second transistor presents a high impedance between the collector and ground terminals of said first transistor, and when said first transistor is rendered non-operating said second transistor presents substantially zero impedance between the collector and ground terminals of said second transistor.

8. A gating circuit comprising in combination a first and a second transistor, each comprising a semiconductor body, an emitter electrode, a collector electrode and a base electrode in contact with said body, a signal input circuit connected between the emitter and base terminals in a first one of said transistors, a signal output circuit connected between the collector and base terminals of said first transistor, the emitter electrode of said second transistor connected to the emitter electrode of said first transistor, the collector electrode of said second transistor connected to the base electrode of said first transistor through a resistance which is substantially zero, the base electrode of said second transistor connected to the base electrode of said first transistor through a resistance which is high relative to the resistance of the base electrode of said second transistor, whereby said second transistor presents a two-terminal impedance across the collector and base terminals of said first transistor, means for biasing said transistor electrodes to normal operating potentials, means connected to said first transistor and said second transistor for alternately changing the biasing potentials on the electrodes thereof from operating to non-operating condition, whereby when said first transistor is rendered operating said second transistor presents a high impedance between the collector and base terminals of said first transistor, and when said first transistor is rendered non-operating said second transistor presents substantially zero impedance between the collector and base terminals of said first transistor.

9. A circuit comprising in combination a pair of transistors each having an emitter electrode, a collector electrode and a base electrode, all in contact with said semiconductor body, the collectors of said transistors connected together, the base electrode of said first transistor substantially grounded, the emitter electrode of said second transistor substantially grounded, the base electrode of said second transistor connected to ground through a circuit having a high resistance relative to the base resistance of said second transistor, means comprising a source of biasing current for supplying bias to the electrodes of said transistors, a source of signal current connected to the emitter electrode of said first transistor, a signal utilization current connected to said collector circuits, a unidirectional current conduction device connected to said collector circuits, said unidirectional current conduction device connected in parallel with a resistance element which is high relative to the resistance through said unidirectional device in a forward direction, and low relative to the resistance through said device in a reverse direction.

10. A circuit comprising in combination a signal input circuit, a signal output circuit, a transistor including an emitter electrode, a collector electrode and a base electrode all in contact with a semiconducting body, said transistor connected in shunt as a two-terminal impedance element across said signal input and output circuits, biasing means which varies between a first condition for normal operation of said transistor and a second condition precluding normal operation of said transistor thereby changing the impedance presented by said transistor circuit for signal currents across said signal output circuit from substantially zero in one condition of said biasing means and a value which is high relative to the impedance of said output circuit in the other condition of said biasing means.

11. A gating circuit comprising in combination, a signal current source, a signal output circuit, a pair of transistors connected to operate in phase opposition relation between said signal current source and said signal output circuit, a source of biasing current in energy transfer relation with the electrodes of said transistors for energizing said transistors in opposite phase relation, and means for substantially varying the polarity of said biasing current relative to a given reference value whereby one of said transistors presents substantially zero impedance during one polarity of said biasing current and a high impedance during the other polarity of said biasing current, and whereby the other of said transistors presents substantially zero impedance and a high impedance in reverse relation to said first transistor.

12. A gating circuit for operation between a signal source and a signal utilization circuit which comprises in combination a transistor having an emitter electrode, a collector electrode and a base electrode all in contact with a block of semiconductor material, means for biasing said transistor to normal operating potential, a pair of signal conduction paths for passage of signals respectively in a forward direction and in a reverse direction between said signal source and said signal utilization circuit, one of said first two electrodes connected to one of the signal paths of said pair, the other of said first two electrodes and said base electrodes connected at a given point in the other signal path of said pair, the external circuit between said base electrode and said point having a resistance which is high relative to the resistance of said base electrode, and means connected to said biasing means for varying the relative biasing potentials of said transistor above and below a given critical condition whereby said transistor presents an impedance which is alternately varied between zero and a value which is high relative to the impedance to said utilization circuit.

13. A sampling circuit which comprises in combination a signal source, a signal utilization circuit, a first and a second transistor, each comprising an emitter electrode, a collector electrode and a base electrode in contact with a semiconductor body, a first junction to which is connected said signal source, the emitter of said first transistor, and the collector of said second transistor, a second junction to which is connected said signal utilization circuit, the collector of said first transistor, and the emitter of said second transistor, the base electrode in each of said transistors connected to respective collector electrode thereof through a resistance which is large compared to the resistance of the respective base electrode, and a pulsing source having a repetition rate which is high relative to the frequency of said source coupled to said transistors to alternatively change the bias on said transistors from a first condition wherein the first one of said transistors presents an impedance which is substantially zero and the second of said transistors presents an impedance which is high relative to the impedance of said signal utilization circuit, and a second condition in which said second transistor presents an impedance which is substantially zero and said first transistor presents an impedance which is high relative to the impedance of said signal utilization circuit.

REYMOND J. KIRCHER.

No references cited.